United States Patent
Molne et al.

(10) Patent No.: US 9,977,537 B2
(45) Date of Patent: *May 22, 2018

(54) HYBRID FORCE SENSITIVE TOUCH DEVICES

(71) Applicant: Apple Inc., Cupertino, CA (US)

(72) Inventors: Anders L. Molne, Cary, NC (US); David Griffith, Apex, NC (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/091,829

(22) Filed: Apr. 6, 2016

(65) Prior Publication Data

US 2016/0216842 A1    Jul. 28, 2016

Related U.S. Application Data

(63) Continuation of application No. 13/915,267, filed on Jun. 11, 2013, now Pat. No. 9,329,719, which is a (Continued)

(51) Int. Cl.
*G06F 3/045* (2006.01)
*G06F 3/041* (2006.01)
(Continued)

(52) U.S. Cl.
CPC ............ *G06F 3/0418* (2013.01); *G06F 3/044* (2013.01); *G06F 3/045* (2013.01); *G06F 3/0414* (2013.01);
(Continued)

(58) Field of Classification Search
CPC . G06F 2203/04105; G06F 2203/04106; G06F 3/0414; G06F 3/0416;
(Continued)

(56) References Cited

U.S. PATENT DOCUMENTS 4,550,384 A    10/1985  Kimura
4,697,049 A *  9/1987  Peemoller ............. G06F 3/0414
                                                             177/211
(Continued)

FOREIGN PATENT DOCUMENTS

WO    WO 11/024461    3/2011

OTHER PUBLICATIONS

U.S. Appl. No. 13/369,808, filed Feb. 9, 2012, Lackey.
U.S. Appl. No. 13/915,267, filed Jun. 11, 2013, Mölne et al.

*Primary Examiner* — Michael J Jansen, II
(74) *Attorney, Agent, or Firm* — Brownstein Hyatt Farber Schreck, LLP

(57) ABSTRACT

A hybrid touch-screen display that integrates force-based touch-screen technology with any one from among a group of projective capacitive, surface capacitive, resistive, digital resistive, SAW, IR, APR, DST, optical and electromagnetic touch-screen technologies to provide an ability to compensate for non-perfect force transfer. An alternate implementation is also disclosed that employs a single force sensor for relative force measurement in a system in which force is traditionally not measured, here a water dispenser unit. This allows compensation for varying static loads, run-time calibration, and filtering of extraneous loads through firmware.

17 Claims, 3 Drawing Sheets

Related U.S. Application Data continuation-in-part of application No. 13/425,846, filed on Mar. 21, 2012, now Pat. No. 8,780,543, which is a continuation-in-part of application No. 12/450,138, filed as application No. PCT/US2008/003374 on Mar. 14, 2008, now Pat. No. 8,144,453.

(60) Provisional application No. 61/658,020, filed on Jun. 11, 2012, provisional application No. 60/918,275, filed on Mar. 15, 2007.

(51) Int. Cl.
*G06F 3/044* (2006.01)
*G06F 3/042* (2006.01)
*G06F 3/043* (2006.01)
*G06F 3/046* (2006.01)

(52) U.S. Cl.
CPC ............ *G06F 3/0416* (2013.01); *G06F 3/042* (2013.01); *G06F 3/043* (2013.01); *G06F 3/046* (2013.01); *G06F 2203/04105* (2013.01); *G06F 2203/04106* (2013.01)

(58) Field of Classification Search
CPC ........ G06F 3/0418; G06F 3/042; G06F 3/043; G06F 3/044; G06F 3/045; G06F 3/046
See application file for complete search history.

(56) References Cited

U.S. PATENT DOCUMENTS

| | | | |
|---|---|---|---|
| 5,541,372 A | 7/1996 | Baller | |
| 6,040,846 A | 3/2000 | Stanton et al. | |
| 6,492,979 B1 | 12/2002 | Kent et al. | |
| 7,532,202 B2 | 5/2009 | Roberts | |
| 7,825,778 B2 * | 11/2010 | Nishimura | G06F 3/016 340/407.2 |
| 8,026,906 B2 | 9/2011 | Molne et al. | |
| 8,144,453 B2 | 3/2012 | Brown et al. | |
| 8,169,332 B2 | 6/2012 | Son | |
| 8,203,534 B2 * | 6/2012 | Nishimura | G06F 3/016 178/18.01 |
| 8,269,731 B2 | 9/2012 | Molne | |
| 8,270,148 B2 | 9/2012 | Griffith et al. | |
| 8,421,483 B2 | 4/2013 | Klinghult et al. | |
| 8,547,350 B2 | 10/2013 | Anglin et al. | |
| 8,633,916 B2 | 1/2014 | Bernstein et al. | |
| 8,738,104 B2 | 5/2014 | Yeates | |
| 8,766,925 B2 | 7/2014 | Perlin et al. | |
| 8,780,543 B2 | 7/2014 | Molne et al. | |
| 9,019,209 B2 | 4/2015 | Geaghan | |
| 9,182,837 B2 | 11/2015 | Day | |
| 9,329,719 B2 * | 5/2016 | Molne | G06F 3/0414 |
| 2001/0013855 A1 * | 8/2001 | Fricker | G06F 3/03547 345/156 |
| 2002/0196238 A1 * | 12/2002 | Tsukada | G06F 3/0421 345/173 |
| 2003/0210235 A1 * | 11/2003 | Roberts | G06F 3/0414 345/173 |
| 2006/0119581 A1 | 6/2006 | Levy | |
| 2006/0181517 A1 | 8/2006 | Zadesky et al. | |
| 2006/0181522 A1 * | 8/2006 | Nishimura | G06F 3/016 345/177 |
| 2006/0192657 A1 * | 8/2006 | Nishimura | G06F 3/016 340/407.2 |
| 2006/0232564 A1 * | 10/2006 | Nishimura | G06F 1/18 345/173 |
| 2006/0279548 A1 * | 12/2006 | Geaghan | G06F 3/0416 345/173 |
| 2007/0119698 A1 * | 5/2007 | Day | G06F 3/038 200/510 |
| 2008/0165158 A1 * | 7/2008 | Hotelling | G06F 3/044 345/174 |
| 2009/0243817 A1 | 10/2009 | Son | |
| 2010/0045612 A1 * | 2/2010 | Molne | G06F 1/1626 345/173 |
| 2010/0156814 A1 | 6/2010 | Weber et al. | |
| 2010/0178957 A1 | 7/2010 | Chen | |
| 2010/0245254 A1 | 9/2010 | Olien et al. | |
| 2010/0300772 A1 | 12/2010 | Lee et al. | |
| 2011/0157087 A1 | 6/2011 | Kanehira et al. | |
| 2011/0181402 A1 | 7/2011 | Goodrich et al. | |
| 2011/0227872 A1 | 9/2011 | Huska et al. | |
| 2011/0284348 A1 | 11/2011 | Nohechi | |
| 2012/0154315 A1 | 6/2012 | Aono | |
| 2012/0200526 A1 | 8/2012 | Lackey | |
| 2012/0200789 A1 * | 8/2012 | Molne | G06F 3/0414 349/12 |
| 2012/0327025 A1 | 12/2012 | Huska et al. | |
| 2013/0342501 A1 | 12/2013 | Moine et al. | |

* cited by examiner

HYBRID FORCE SENSITIVE TOUCH DEVICES

CROSS-REFERENCE TO RELATED APPLICATION(S)

This application is a continuation of U.S. patent application Ser. No. 13/915,267, filed Jun. 11, 2013, which is a nonprovisional patent application of and claims the benefit under 35 U.S.C. § 119(e) of U.S. Provisional Patent Application No. 61/658,020, filed on Jun. 11, 2012. U.S. patent application Ser. No. 13/915,267 is also a continuation-in-part of U.S. patent application Ser. No. 13/425,846, filed Mar. 21, 2012, now U.S. Pat. No. 8,780,543, which is a continuation-in-part of U.S. patent application Ser. No. 12/450,138, filed Sep. 11, 2009, now U.S. Pat. No. 8,144,453, which is a national phase entry of International Application No. PCT/US2008/003374, filed Mar. 14, 2008, which claims the benefit under 35 U.S.C § 119(e) of U.S. Provisional Patent Application No. 60/918,275, filed Mar. 15, 2007, the disclosures of which are hereby incorporated by reference herein in their entirety.

BACKGROUND OF THE INVENTION (1) Field of the Invention

The present invention relates to touch sensor controls including touch input systems (touch screens used in fixed or mobile devices, such as point of sales terminals, kiosks, laptops, monitors, POS, POI, PDAs, cell phones, UMPCs and the like). More particularly, the invention relates to touch sensor controls having both a touch-coordinate calculation ability as well as a force sensing ability.

(2) Description of Prior Art

The concept of using multiple force sensing sensors to register, measure and triangulate the touched position of a touch screen has been a known concept for more than twenty years, however, to produce a high quality touch screen solution has proven difficult.

Over the last few years the performance trade-offs of the available force sensing technologies has fragmented the market. There are approximately ten (10) different touch screen technologies. However, only one such technology has been adapted to measure both the touch coordinates as well as the absolute amount of touch force. This is "force-based touch screen technology" as described in U.S. patent application Ser. Nos. 13/425,846; 12/450,138; PCT/US2008/003374; and F-Origin's zTouch™ at www.f-origin.com. The other known touch screen technologies include resistive touchscreens (a resistive contact layer allows the position of a pressure on the screen to be read); surface acoustic wave (SAW) technology (uses ultrasonic waves that pass over the touchscreen panel) to register the position of the touch event; capacitive (touching the surface changes capacitance); surface capacitance (change in the capacitance is measured from the four corners of the panel); optical or infrared sensors and LEDs mounted around a display (the sensors detecting a disruption in the pattern of LED beams); acoustic pulse recognition (tiny transducers attached to the edges of the touchscreen pick up the sound of the touch); Dispersive Signal Technology (DST, which consists of a chemically-strengthened glass substrate with piezos mounted on each corner to pinpoint the source of "bending waves" created by finger or stylus contact; and electromagnetic (change in magnetic flux is registered for the system to compute and define the coordinates of the touch event).

In measuring both the touch coordinates as well as the absolute amount of touch force, force-based touch screen technology such as F-Origin's zTouch™ has a great advantage in that software can ensure that the appropriate finger or stylus is touching the touch screen, and inadvertent pressures can be ignored. There have been a few attempts made to bridge this gap using other touch screen technologies. For example, Stantum™ is using a digital resistive solution that registers a larger touch area (multiple "interference points" in a coordinate grid). The software assumes that it is a finger that is touching the surface and the more touch points that are registering a touch, the larger the force is applied. Unfortunately, this logic fails if the user is using a finger nail or a stylus. Thus, for the time being, force-based touch screen technology retains its advantage. However, there are trade-offs. For example, force-based touch screen technology is only capable of discerning a single touch, and cannot differentiate two or more touches ("multi-touch").

Indeed, all existing touch screen technologies come with a unique set of advantages and disadvantages, and so it is unlikely that any one will completely replace any other.

The most popular touch screen for mobile phones today is the Projective Capacitive (ProCap) touch screen. This technology supports multi-touch and will react to extremely light touches, however, it cannot measure force, nor can it recognize a touch from objects other than fingers or specialized styluses. The following table details the relative strengths and weaknesses of ProCap versus zTouch™ technologies.

| Feature | ProCap | zTouch ™ | Combined |
| --- | --- | --- | --- |
| Multi touch | Yes | No | Yes |
| Force Sensing | No | Yes | Yes |
| 0-gram touch | Yes | No | Yes |
| Settable touch thresholds | No | Yes | Yes |
| Any object touch | No | Yes | Yes |
| Use with water | Some | Yes | Yes |
| Use with conductive gels/liquids | No | Yes | Yes |
| Optical impact | Some | None | Some |

Clearly, the ideal solution combines the benefits of both. It would be advantageous to provide a hybrid touch-screen display that integrates force-based touch-screen technology with any one from among a group of projective capacitive, surface capacitive, resistive, digital resistive, SAW, IR, APR, DST, optical and electromagnetic touch-screen technologies. The "Combined" column in the table illustrates the benefits of a combined zTouch and ProCap solution discussed later in this document.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a hybrid touch-screen display that integrates force-based touch-screen technology with any one from among a group of projective capacitive, surface capacitive, resistive, digital resistive, SAW, IR, APR, DST, optical and electromagnetic touch-screen technologies.

Figure 1:
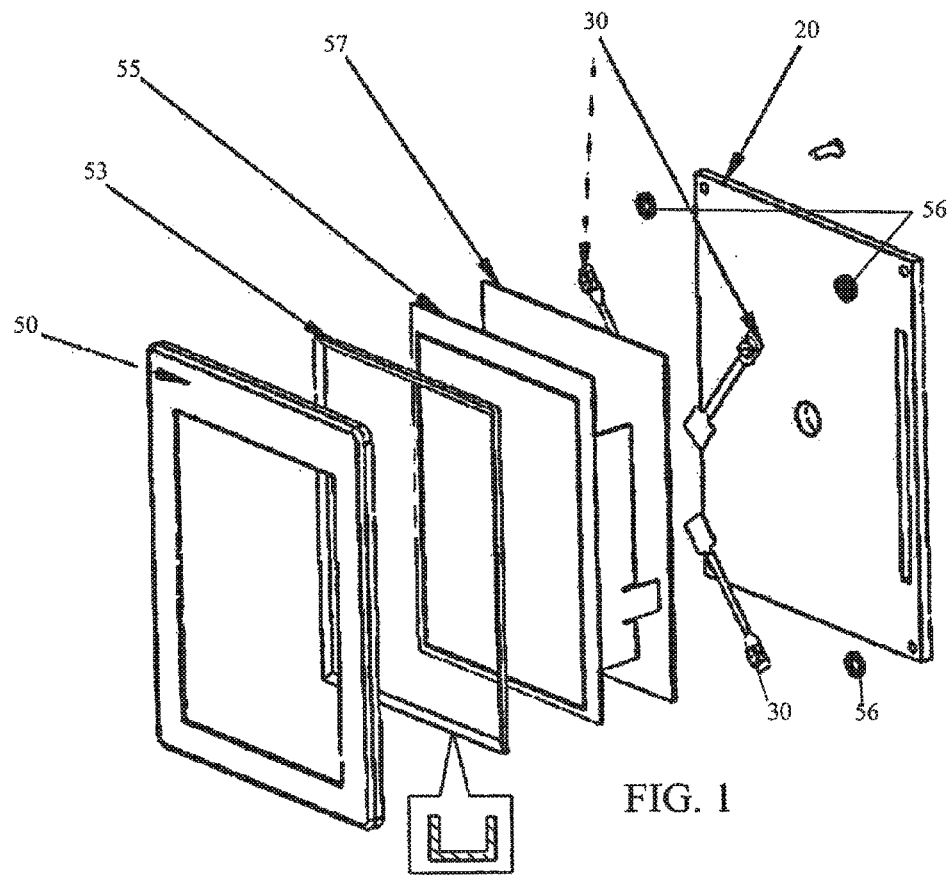
FIG. 1 is an exploded perspective view of a hybrid touch-screen display employing the foregoing principles.
Figure 2:
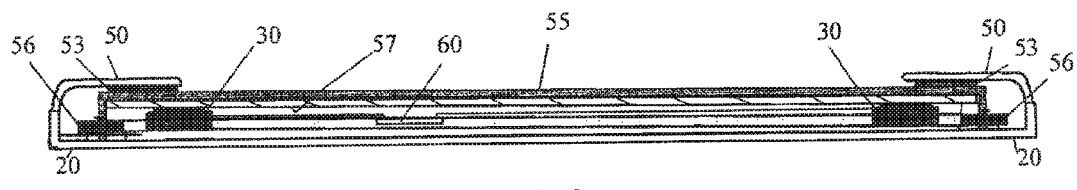
FIG. 2 is a side cross-section of the touch screen system of FIG. 1.

FIG. 1 is an exploded perspective view of a hybrid touch-screen display employing the foregoing principles, and FIG. 2 is a side cross-section of the touch screen system of FIG. 1. With collective reference to FIGS. 1-2, the illustrated embodiment employs a Projective Capacitive (ProCap) touch display screen 55, a support structure 57 for the display screen 55, and one or more force sensors 30 (here four corner-mounted force sensors 30 shown). The force sensor(s) 30 may be affixed directly (surface-mounted) to the back of the support structure 57 or indirectly (by traces as shown) to a sensor printed circuit board (not shown) which is in turn attached to an opposing base substrate 20 (which may be the back of a device housing).

The touch display screen 55 may be ProCap or any of the other non-force-sensing technologies including any one from among a group of projective capacitive, surface capacitive, resistive, digital resistive, SAW, IR, APR, DST, optical and electromagnetic touch-screen technologies.

One skilled in the art will understand that the system of the present invention requires a control system including non-transitory computer memory, and at least one programmable controller programmed with control software comprising computer instructions stored on the non-transitory computer memory. The control system requires at least one programmable controller for running a first software module for interpreting touch display screen 55, a second software module for interpreting sensors 30, and a third software module for interfacing the first and second software modules and for reconciling the results. As described more fully below, these modules may reside on two or more separate controllers, for example, one for touch display screen 152, one for FSR sensors 30, and one for the reconciliation software module.

The edges of the touch display screen 55 may be protected by a front-mounted frame or bezel 50 as shown, although the touch surface of the touch display screen 55 remains exposed through frame 50. Optional rubberized padding 53 may be placed as shown underlying the frame 50 and adhered thereto. The padding 53 may be a continuous rectangular gasket made of Poron™ for example, which helps to cushion the touch display screen 55 and imposes a spring-like preloading force to minimize the impact from shock and vibration. As an alternative to a continuous gasket, a continuous silicon membrane may be used for liquid/water proofing as well as providing pre-loading 53. The pre-loading can however also be provided by added spring elements such as two flat spring arms (not shown). The maximum allowed movement, as allowed by the internal compression of the sensors 30 and the padding 53 is typically between 0.01-0.03 mm, but may be somewhat larger depending on sensor type, padding material and operational force range. Similarly, optional rubberized damping pads 56 may be placed as shown underlying the sensors 30 and adhered thereto.

The one or more force sensor(s) 30 may comprise any conventional force-sensing resistive (FSR) sensors, piezo resistive sensors, or FTR (force transducing rubber) sensor. FSR sensors are typically made up of two plans of conductive materials "connected" through FSR material. Different types of resistive materials may be used. The common characteristics of the FSR material are that it remains non-conductive until a force is applied. When a force is applied, the resistance in the material decreases as the applied force increases. Modular FSR sensors are commercially-available. In addition, for higher accuracy system, piezo resistive force sensors, such as the HFD-500 force sensor 30 available from HDK™ can be used. It comes in a small resin mold package with a 1/16 inch steel ball in contact with the silicon wafer (the piezo sensor). The HFD-500 Micro-Force Sensor can detect changes in applied force of one gram force or less. The single-axis device uses a piezo resistive sensor (crystal silicon sensor chip) that changes its resistance as a function of the pressure applied through the steel ball, creating a proportional output signal via internal bridge circuitry. Sensitivity for these types of sensors is typically in the 10 to 20 mV/N with a linearity of ±3% with a 3V supply current.

FTR is a polymer thick film (PTF) commonly used for keyboard applications. Any other suitable force sensor, such as for example, capacitive force sensors may also be used.

Given at least one centrally-mounted force sensor 30, the sensor 30 is capable of registering absolute force $F_Z$ along the z-axis orthogonal to the plane of the touch screen display 55. Given a plurality (such as, for example, four) differentially corner-mounted force sensors 30, each sensor 30 registers a different force as a function of the two-dimensional (x, y) coordinates along the plane of the frame 50. By calculating the differential pressure at the corners the exact coordinate of the actual touch can be calculated.

Figure 3:
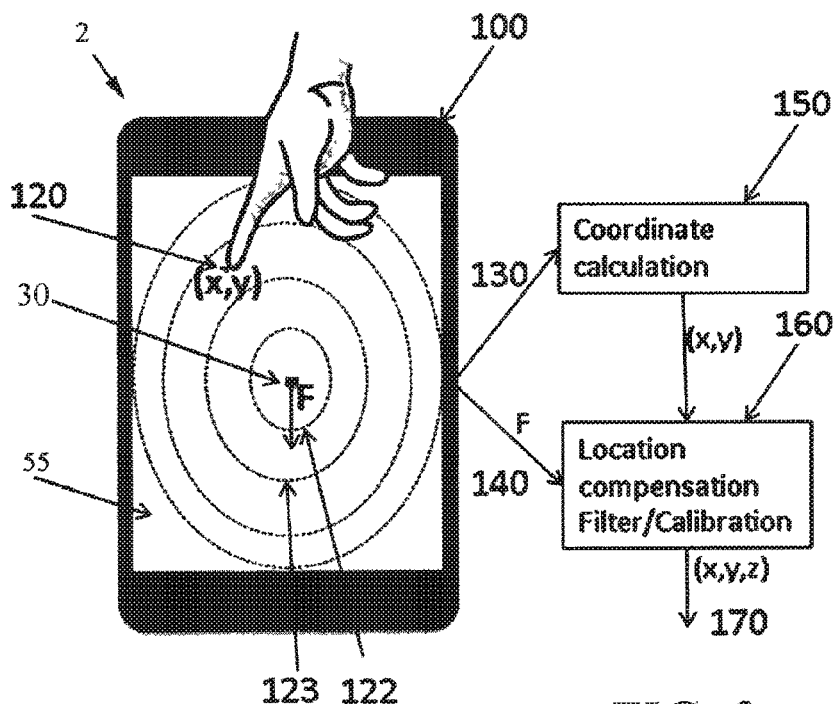
FIG. 3 is a perspective drawing illustrating an exemplary method of operation of the hybrid touch-screen display of FIGS. 1-2 using one (1) force sensor.

FIG. 3 is a perspective drawing illustrating an exemplary method of operation of the hybrid touch-screen display of FIGS. 1-2 in the context of a mobile phone 2, using a single centrally-mounted force sensor 30 implemented underneath the touch display screen 55 of the mobile phone 2 at point F. Note that for most mobile phones the LCD display and the touch display screen 55 are combined into a single module, most often together with additional layers, such as protective surface glass and anti-reflection coating, etc., and touch display screen 55 represents this module. As a user touches the touch display screen 55 surface at point 120, the ProCap (or other) touch display screen 55 itself transmits the exact two-dimensional (x, y) touch coordinates along the plane of the touch display screen 55. In addition, a component of the force of the touch is transferred through the touch display screen 55 to the force sensor 30 behind the screen 55, and the absolute touch pressure can be computed as will be described.

The touch display screen 55 is preferably implemented to allow for a very small movement flexing along the z-axis, typically in the range of one or a few 1/100 mm. Thus, given the user touch at point 120 (FIG. 3), the exact two-dimensional (x, y) touch coordinates known from the non-force-sensing (ProCap or other) touch display screen 55, and the z-axis force component $F_c$ known from the force sensor(s) 30 behind the module, then in accordance with the present method at block 150 the processor computes the absolute touch pressure Fz. In order to reach an optimal performance, at block 160 the sensor data is filtered based on the z-axis force component $F_c$ from block 150, to filter out unintentional or inadvertent touches (light pressures), or shock or vibration.

One skilled in the art should readily understand that it is also possible to place the sensor 30 on plane with the touch panel 55 by keeping it outside of the actual touch area.

Figure 4:
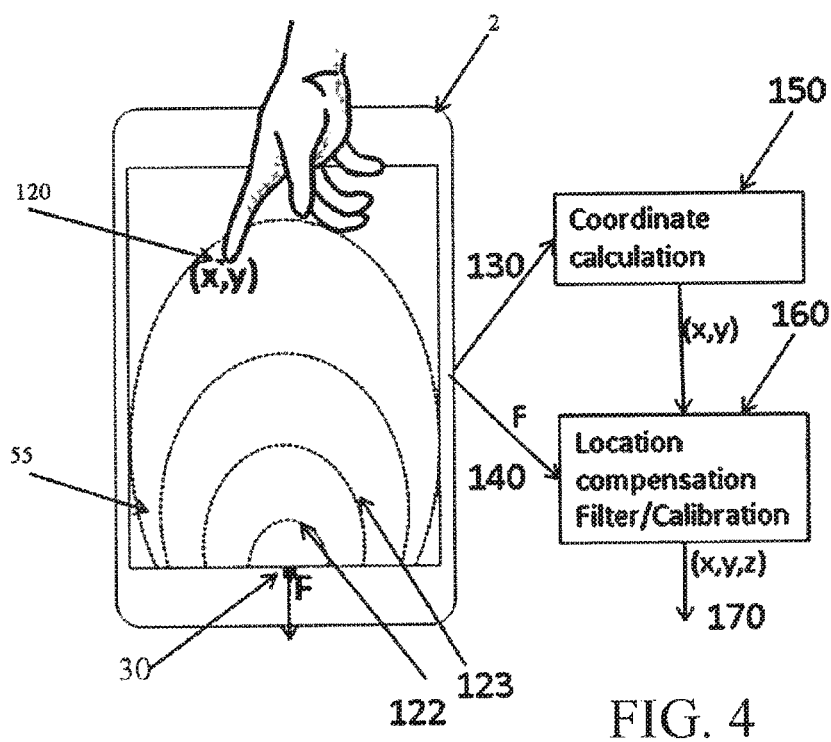
FIG. 4 is a perspective drawing illustrating an exemplary on-plane sensor 30 in the context of a mobile phone with sensor in an alternative location compared to FIG. 3.

FIG. 4 is a perspective drawing illustrating an exemplary on-plane sensor 30 in the context of a mobile phone 2, here using a single offset-mounted force sensor 30 implemented below the touch display screen 55 of the mobile phone 2 at point F.

It is virtually impossible to implement a touch system where the absolute touch pressure Fz from touch panel 55 transfers perfectly and without any frictional or bending forces directly to the force sensor 30, especially as such mechanical provisions will consume space, which is very limited in a mobile phone 2 or most consumer electronics. Instead, the present system is pre-programmed to compensate for non-perfect force transfer. Thus, to compute the absolute touch pressure Fz at block 150 (FIG. 3 or 4), the processor software may subdivide the touch area of touch panel 55 into different zones or "force rings" 122, 123, etc. For example, when a user touches the touch area at point 120 with force Fz (near the sensor 30) it occurs within zone 122. At this point 122 the sensor 30 will register a relatively higher force Fc than if the user had touched the touch panel 55 with exactly the same force Fz in the next zone further away 123. This imperfect translation problem can however be compensated for based on the ProCap touch coordinates (x,y) and a predetermined coordinate force mapping. Specifically, a pre-determined compensation factor C may be used. For example, when a user touches the touch area at point 120 and sensor 30 reads force Fc (near the sensor 30) within zone 122, the processor may attribute a compensation factor of 1.1 and multiply 1.1×Fc to attribute an absolute touch pressure Fz. The closer a touch is applied to the sensor 30 location, the higher the force Fc will be registered, and the smaller the compensation. Conversely, when a user touches the touch area within zone 123 and sensor 30 reads force Fc (further from the sensor 30), the processor may attribute a compensation factor of 1.3 and multiply 1.3×Fc to attribute an absolute touch pressure Fz. The entire touch surface of touch screen display 55 is mapped into zones in this manner. Depending on the nature of the mechanical implementation, this compensation can be added as a compensation matrix (look-up table) or pre-defined compensation equation (as function of touch coordinate). Once the absolute force Fz is calculated from compensated Fc, a three dimensional touch coordinate (x,y,Fz), or simply (x,y,z), can be exported to the operating system and/or overlaying applications. The (x,y,z) coordinate output can easily support gestures, such as a line drawing where the z-coordinate can add another dimension, such as line thickness as a function of applied force. In addition, a time stamp can be exported and combined with the (x,y,z) coordinates by the operating system. The absolute force component Fz is combined with coordinates (x,y) to yield (x,y,z) and all may be time-tagged $(x_{t1}, y_{t1}, z_{t1})$ at block 150, to ensure that the correct coordinates are used for force compensation of the correct force and later paired together in matching sequence.

It should be noted that the force compensation and calculation in block 150 is completed in real time in milliseconds or less.

Moreover, given (x,y,z) coordinate output it now becomes possible to filter out very light and unintentional touches at block 160. If for example the user brushes the display accidently with a finger at a very low force, such as 5 grams, the force sensor 30 measures a force of 2.1 gram at a specific time, t1. The force compensation based on the touch zone (122, 123, etc.) is added and the compensated force $z_{t1}$ is estimated to 5 grams.

The result $(x1, y1, 5\ gram)^{t1}$ is checked against pre-programmed touch thresholds, such as for example a minimum threshold of 15 grams. In this case the touch coordinate (x1, y1, 5 gram) for t1 is not communicated up to the operating system.

One skilled in the art may recognize that adding full force-sensing touch screen capabilities as described above to a non-force sensing touch screen technology will require a software implementation that accommodate pre-existing dedicated software modules, working in conjunction with additional software.

Figure 5:
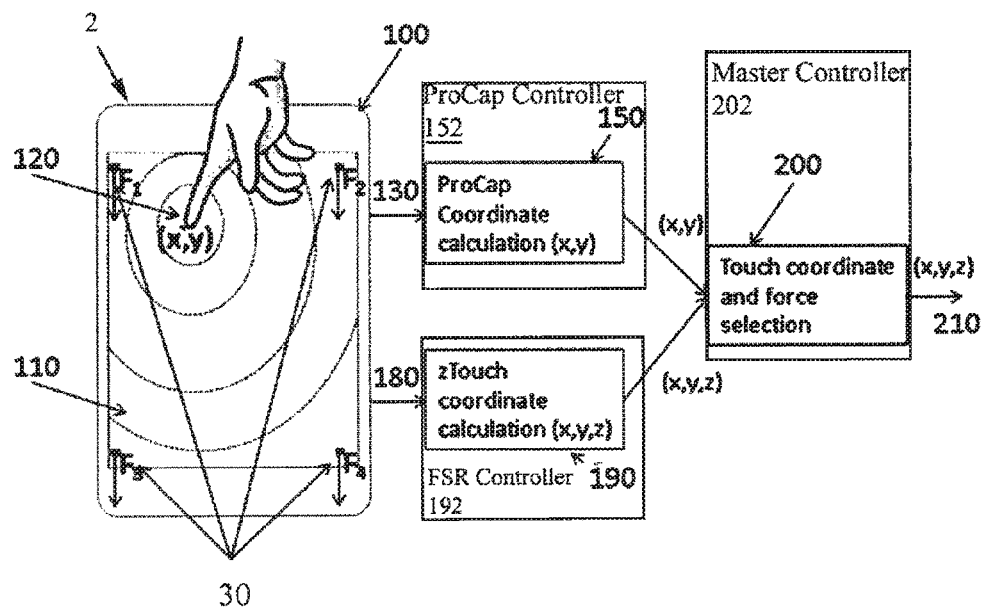
FIG. 5 is a perspective drawing illustrating an exemplary method for adding full force-sensing touch screen capabilities to a non-force sensing touch screen.

For example, FIG. 5 is a perspective drawing illustrating an exemplary method for adding full force-sensing touch screen capabilities to a non-force sensing touch screen in the context of a mobile phone, using four corner-mounted force sensors 30 implemented underneath the touch display screen 55 of the mobile phone 2 as in FIG. 2. This entails a reconciliation software module 200. Essentially, a first software module 150 is used to calculate coordinates (x,y,) for the non-force-sensing (ProCap or other) touch display screen 55, a second software module 190 obtains the z-axis force component $F_c$ known from the force sensor 30 behind the module, and third reconciliation software module 200 performs force Fc compensation, calculation of three dimensional touch coordinates (x,y,z), and time tagging for export to the operating system, and/or overlaying applications. The system represented by FIG. 5 presumes an existing ProCap touch panel 55 with its own dedicated controller 152, plus a separate zTouch™-type FSR system with four sensors 30 having their own dedicated controller 192, controllers 152 and 192 interfacing at reconciliation software module 200. The software modules 150, 190 may be firmware and may reside on respective processors 152, 192, and module 200 may be firmware resident on either processor 152, 192 or on a third master controller 202, most likely, a main system processor. Both coordinate calculations are communicated to master controller 202. The ProCap controller 152 runs the first software module 150 and is dedicated to calculating ProCap coordinates (x,y) for the non-force-sensing touch display screen 55. For example, as seen in FIG. 5, the zTouch™ controller 192 runs the second software module to obtain zTouch™ coordinates plus the z-axis force component $F_c$ known from the force sensor 30 behind the module (x,y,z). The main system processor 202 runs the third reconciliation software module 200 and performs force Fc compensation, comparison of the ProCap coordinates (x,y,) with zTouch™ coordinates (x,y,z), filtering of the two sets of touch coordinates (x,y,z), and time tagging for export to the operating system, and/or overlaying applications. In this case touch decisions made by master controller 202 may include the following:

If the force component z in the zTouch™ coordinate calculation is less than F, do not export coordinates.

If the Procap(x,y) and zTouch™ (x,y,z) coordinates are both known, use the (x,y) coordinate from ProCap, combine with force component from zTouch™ coordinate (x,y,z,) and export the new (x,y,z) coordinate 210.

If only the x,y coordinates from the zTouch™ coordinate calculation 190 are known (then is likely that the user is using a stylus), use only the zTouch™ coordinates (x,y) for the final coordinate (x,y,z).

If the Procap (x,y) coordinates match a pattern associated with interference from water or conductive liquid, disregard the ProCap coordinates 150 and use only the zTouch coordinates (190).

Note, if there is no applied force Fc, ignore coordinate input.

If multi touch, multiple (x,y) coordinates are recognized at the same time, only use the force loading of the zTouch™ coordinate calculation 190.

As described above with regard to FIGS. 3-4, the four force sensors 30 in the multi-touch system of FIG. 5 may be placed outside of the touch panel 55 display area, in-plane with the touch panel 55, in the same way.

It should now be apparent how adding the force dimension z to the touch coordinates x,y improves the information sent to the operating system/overlying applications, and will allow for additional functionality. One skilled in the art may foresee additional features or feature enhancements attainable by adding force-sensing capability in parallel with a different touch screen system, such as a ProCap touch system, and such additional features or feature enhancements are considered within the scope and spirit of the invention.

It should also be apparent that the above-described embodiments all involve a hybrid implementation of a zTouch force-sensing technology with a suitable non-force sensing touch screen technology. However, in its most basic implementation, the present invention may comprise one single force sensor and zTouch™ firmware running on a processor or microcontroller.

Figure 6:
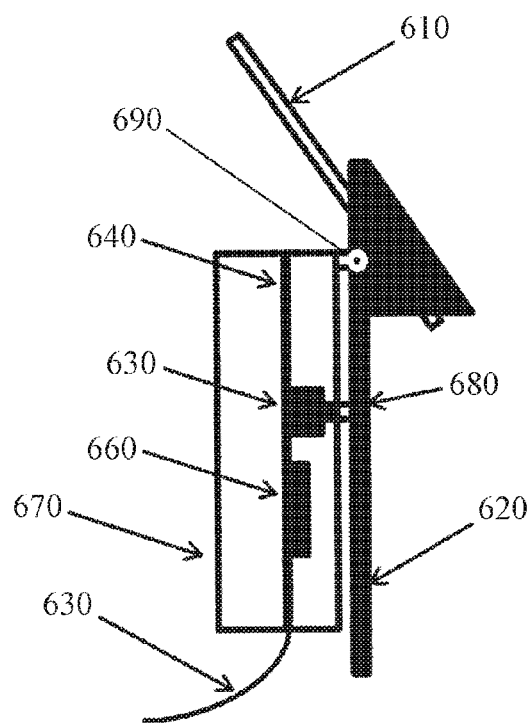
FIG. 6 is a perspective drawing of an exemplary water dispenser unit, in which a user presses a glass or a cup against a touch lever 20.

As an example, FIG. 6 is a perspective drawing of an exemplary water dispenser unit, in which a user presses a glass or a cup against a touch lever 620. Lever 620 is hinged to a main housing through a hinge mechanism 690. The touch force from the glass is transferred via any suitable force transfer feature 680, such as a spring-loaded detent, or other suitable mechanical feature allowing the force to be transferred to a sensor housing 670 at a single point. The force is transferred through the flexible wall/membrane of the sensor housing 670 directly onto a force sensor 630. Prior art implementations use an on/off switch incapable of relative force measurement. Here, the increased touch force from the glass will result in an increased voltage output from the sensor 630 which preferably resides on a sensor PCB 640. The analog signal from sensor 630 is amplified and sent into a micro controller 660 which may also reside on the PCB 640. The microcontroller 660 will convert the analog (voltage) data to digital input data. The above-described firmware runs on the microcontroller 660 and interprets and filters the touch data. The added force-sensing ability of sensor 630 allows additional software features in the firmware that can always ensure that the system is auto-calibrated in between touches, and to determine if a touch is an actual touch or just a temporary static load by analyzing the force pattern. Permanent changes in static load, for example if the touch panel is removed and replaced with a new part which adds a slightly different static load, can be easily compensated. The delta load can be calibrated out and ignored through firmware calibration.

Once the firmware on the microcontroller 660 determines that the added force to the touch lever 620 is the result of a true touch of a glass, the result or command is communicated via any suitable data communication to a water flow controller or pump that will open up the water flow in the water line 610.

The above-described implementation is but one example of a single force sensor control unit in a water dispenser unit, but other implementations are possible where the functional purpose may be completely different, mechanics may look different, and the zTouch™ firmware may reside in a shared processor running as an integrated part of the system code. Additional implementations or feature enhancements to existing implementations considered within the scope and spirit of the invention.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A hybrid touch and force sensing apparatus, comprising:
   a touch panel having one or more sensors adapted to determine coordinates of a received touch;
   one or more force-based touch sensors coupled to the touch panel; and
   a processor; wherein
   the touch panel outputs the coordinates of the received touch to the processor and the one or more force-based touch sensor outputs sensors output a z-force coordinate to the processor;
   the processor divides the touch panel into a plurality of zones, determines which of the plurality of zones received the touch, retrieves a predetermined compensation factor for a determined zone, and applies the predetermined compensation factor to the z-force coordinate; and
   the predetermined compensation factor is based on a distance between the coordinates of the received touch and the one or more force-based touch sensors.

2. The hybrid touch and force sensing apparatus of claim 1, further comprising:
   a touch-screen display; wherein
   the touch panel is part of the touch-screen display.

3. The hybrid touch and force sensing apparatus of claim 1, wherein the touch panel comprises a capacitive touch panel.

4. The hybrid touch and force sensing apparatus of claim 1, wherein the touch panel comprises a resistive touch panel.

5. The hybrid touch and force sensing apparatus of claim 1, wherein the touch panel comprises an ultrasonic touch panel.

6. The hybrid touch and force sensing apparatus of claim 1, wherein the touch panel comprises an optical touch panel.

7. The hybrid touch and force sensing apparatus of claim 1, wherein the touch panel comprises an electromagnetic touch panel.

8. The hybrid touch and force sensing apparatus of claim 1, wherein a force-based touch sensor of the one or more force-based touch sensors is coupled to the touch panel at a corner of the touch panel.

9. The hybrid touch and force sensing apparatus of claim 1, further comprising: a printed circuit board; wherein the one or more force-based touch sensors are mounted on the printed circuit board.

10. The hybrid touch and force sensing apparatus of claim 1, wherein the one or more force-based touch sensors comprise a force sensing resistive sensor.

11. The hybrid touch and force sensing apparatus of claim 1, wherein the one or more force-based touch sensors comprise a force transducing rubber sensor.

12. A method for calculating an amount of force provided on a touch panel of an electronic device, the method comprising:
- determining, using one or more sensors, coordinates of a touch received on the touch panel;
- determining a force component of the received touch using one or more force sensors;
- dividing the touch panel into a plurality of zones;
- determining which of the plurality of zones received the touch;
- retrieving a predetermined compensation factor for a determined zone in the plurality of zones; and
- applying the predetermined compensation factor to the force component;
- wherein the predetermined compensation factor is based on a distance between the coordinates of the touch and the one or more force sensors.

13. The method of claim 12, wherein the predetermined compensation factor is different for each zone in the plurality of zones.

14. The method of claim 12, further comprising comparing the force component to a touch threshold to determine whether the received touch is an intended touch.

15. The method of claim 12, wherein the touch panel is part of a touch-screen display.

16. The method of claim 12, wherein the one or more force sensors comprise a force sensing resistive sensor.

17. The method of claim 12, wherein the one or more force sensors comprise a force transducing rubber sensor.

* * * * *